July 22, 1947.　　　　N. T. GORDON　　　　2,424,454
INFRARED GENERATOR
Filed Sept. 25, 1944
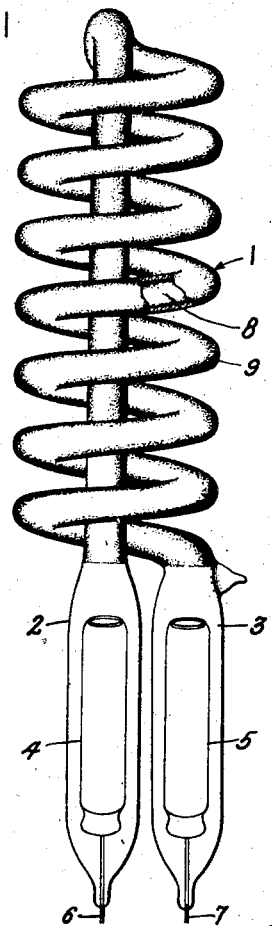
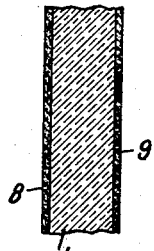
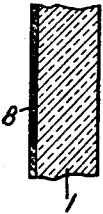
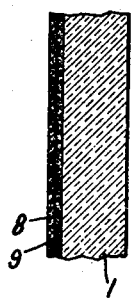
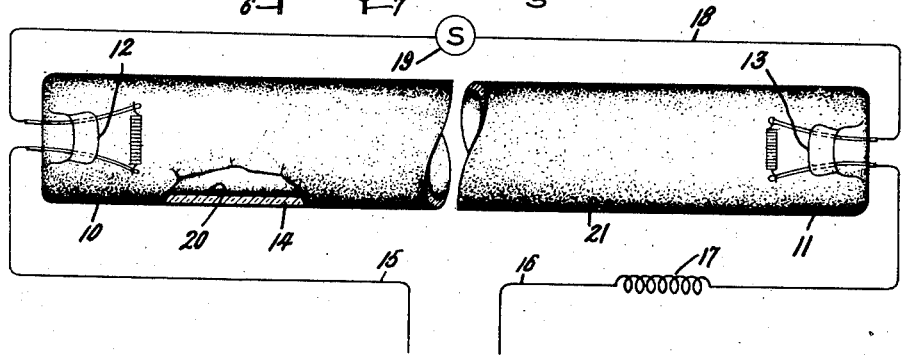
Inventor:
Newell T. Gordon,
by Harry E. Dunham
His Attorney.

Patented July 22, 1947

2,424,454

UNITED STATES PATENT OFFICE 2,424,454

INFRARED GENERATOR

Newell T. Gordon, Schenectady, N. Y., assignor to General Electric Company, a corporation of New York Application September 25, 1944, Serial No. 555,669

1 Claim. (Cl. 176—122)

The present invention relates to electric discharge devices and comprises electric discharge devices whereby abundant infrared radiation may be generated. Infrared radiation is utilized in signalling and therapy devices.

Conventional infrared generators, such for example as incandescent filament lamps, unavoidably emit radiation in the visible and ultraviolet spectral range in addition to the desired infrared rays. For some purposes the shorter wave length rays are undesired and disturbing.

My invention includes a phospor which is capable of emitting by fluorescence predominantly radiations in the infrared spectral region.

My invention comprises in one of its aspects a combination of phosphors, the combination being excitable by agencies available for inducing fluorescence and when excited being capable of generating infrared radiation.

In the accompanying drawing, Fig. 1 is a side view of a cold cathode type of positive column lamp embodying my invention; Fig. 2 is a side view of a thermionic cathode type of lamp also embodying my invention; and Figs. 3, 4 and 5 are enlarged sectional views of portions of the wall of such lamps, and illustrate different combinations of phosphors.

The lamp shown in Fig. 1 comprises a suitably coiled tubular portion 1, for the emission of infrared radiations. The coiled tube communicates with terminal enlargements 2, 3 containing hollow, cylindrical electrodes 4, 5. If desired, these electrodes, which consist of nickel, iron or other suitable conductive material, may be coated with a good electron emitter, such as barium. These are mounted upon metal lead wires 6, 7 which are sealed into the glass wall of the envelope as well understood. The tubular envelope may consist of a glass, for example, lime glass or a borosilicate glass, which is permeable to chosen long ultraviolet radiations. For example, the glass constituting the container may be chosen to be transparent to radiations having wave lengths in the range of about 3400 to 3800 angstrom units and also the shorter violet and blue light rays. In a modification which will be described later, the chosen glass should be transparent to short wave ultraviolet radiation.

The envelope of this lamp, after being suitably degassed and evacuated, is charged with a suitable gaseous atmosphere. For example, it may contain a small quantity of mercury and an auxliairy, inert gas, as for example argon or other rare gas. The auxiliary gas suitably may have a pressure within a range of a few millimeters to about 10 to 20 millimeters. As is well known, such a gaseous mixture when energized with current at a voltage of a few thousand volts, whereby about 20 to 100 milliamperes of current is conducted, results in an abundant generation of short wave ultraviolet of 2537 A. wave length. In some signalling devices of the "flasher" type, the momentary current which is conducted during each flash may be very much greater. In some cases the ionizable atmosphere of the lamp may consist of a rare gas devoid of mercury, for example, neon or argon. The short wave ultraviolet which is generated therein in such case has a wave length in the range of 700 to 1200 A. units.

The interior surface of the envelope wall is coated with a phosphor 8, which when exposed to short wave ultraviolet generates by fluorescence longer wave length radiations in the approximate range of 3400 to 4400 A. units, and particularly ultraviolet radiations of about 3650 A. A suitable phosphor for this purpose is the cerium-activated alkaline earth phosphate described in U. S. Patent 2,306,567 to Roberts, patented December 29, 1942. Such a phosphor, for example, cerium-activated calcium phosphate, may be applied upon the interior glass surface mixed with a solution of a nitrocellulose binder as described in this Roberts patent. The binder, after application of the phosphor, is largely removed by a suitable baking treatment. In some cases a phosphor may be used, such as calcium tungstate, which when excited emits both long wave ultraviolet and visible light near the violet end of the visible spectrum.

The external surface of the envelope is coated with a phosphor capable of emitting infrared radiations when excited by radiations of shorter wave length, that is, by radiations of the long ultraviolet and short visible type. Such a phosphor has been indicated by the stippling 9 on the exterior of the envelope.

The latter phosphor, in accordance with one of the features of my invention, may consist of a mixture of zinc-cadmium sulphide activated with copper in which the content of cadmium sulphide exceeds 60 per cent, and preferably is within a range of about 70 to 90 per cent. These percentages refer to the unfired, raw phosphor. Firing may produce some deviation in percentage composition. In some cases the infrared phosphor may consist wholly of cadium sulphide, activated with copper, in which case the emitted infrared radiation is of maximum length, that is, has a wave length predominantly above 9000 A.

Fig. 2 shows a fluorescent lamp containing thermionic cathodes 10, 11, the leading-in wires of which are sealed as usual into reentrance stems 12, 13 of the glass envelope 14. The glass of the envelope is chosen to transmit long wave ultraviolet and visible light. The lamp is shown as being connected to supply conductors 15, 16 in series with a reactance 17. In shunt to the lamp is connected a conductor 18 containing a switch 19 which may assume various known forms for automatically opening the shunt circuit 17 when the cathodes 10, 11 have been heated to approximately normal emitting temperature. The cathodes initially are heated by the passage of current supplied by the conductors 15, 16, the switch 19 being in a closed position. When the switch 19 is open current passes through the gas, ionizing it and emitting short wave ultraviolet radiation.

The lamp shown in Fig. 2 is coated upon the interior with a phosphor 20, for example calcium phosphate or calcium tungstate, which when excited by short wave radiation is capable of emitting long wave ultraviolet and visible light radiations which are capable of exciting the infrared phosphor. The exterior of the envelope is coated by a phosphor 21, such as described above, which is capable of emitting infrared radiation when excited by long wave ultraviolet and by blue light.

Fig. 3 is an enlarged sectional view of the glass wall 1 which is coated upon the interior with a phosphor 8. The latter is activated by short wave ultraviolet and emits long wave ultraviolet. On the opposite side of the glass wall is a phosphor 9 which when excited by radiations from the phosphor 8 will emit infrared radiation.

As shown in Fig. 4, the two complementary phosphors 8 and 9 for emitting long wave ultraviolet and infrared are shown as being superimposed upon one another upon the interior surface of the glass wall 1. The phosphor 8 is exposed to the short wave ultraviolet generated by the passage of current through the gas filling in the lamp.

As indicated in Fig. 5, the ultraviolet and infrared-emitting phosphors may be applied as a mixture to form a coating 20 upon the interior wall surface of the container 1. It is permissible to constitute the wall of the envelope of an infrared discharge device of glass which is capable of transmitting ultraviolet of 2537 A. wave length. Such a glass is obtainable from the Corning Glass Company of Corning, N. Y., as No. 974 glass. The combination of multiple layer phosphors of Fig. 4 or the phosphor mixture of Fig. 5 then may be applied upon the exterior surface of the envelope. If the lamp is filled with an atmosphere generating radiation of materially shorter wave length then the phosphor combination should be applied inside the lamp.

The infrared-generating phosphor comprising an essential feature of my invention is to a considerable extent opaque to ultraviolet and visible radiations. Hence, in a device embodying my invention the eye is shielded from such radiations. However, a suitably colored, or a so-called "black glass" may be used to suitably shield the eye from visible light.

What I claim as new and desire to secure by Letters Patent of the United States is:

An infrared generator comprising the combination of a phosphor composition including copper-activated cadmium-zinc sulfide containing about 70 to 90 per cent cadmium sulfide and means for exciting said phosphor whereby a high proportion of infrared radiation is emitted thereby.

NEWELL T. GORDON.

REFERENCES CITED

The following references are of record in the file of this patent:

UNITED STATES PATENTS

| Number | Name | Date |
| --- | --- | --- |
| 2,126,233 | Wakenhut | Aug. 9, 1938 |
| 2,030,403 | Ruttenauer | Feb. 11, 1936 |
| 2,152,989 | Ewest | Apr. 4, 1939 |
| 2,296,643 | Leverenz | Sept. 22, 1942 |
| 2,314,096 | Leverenz | Mar. 16, 1943 |
| 2,346,522 | Gessel | Apr. 11, 1944 |

FOREIGN PATENTS

| Number | Country | Date |
| --- | --- | --- |
| 517,526 | Great Britain | Feb. 1, 1940 |